United States Patent
Suh et al.

(10) Patent No.: US 11,294,677 B2
(45) Date of Patent: Apr. 5, 2022

(54) ELECTRONIC DEVICE AND CONTROL METHOD THEREOF

(71) Applicant: SAMSUNG ELECTRONICS CO., LTD., Suwon-si (KR)

(72) Inventors: Dongkwan Suh, Suwon-si (KR); Jonghun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/098,683

(22) Filed: Nov. 16, 2020

(65) Prior Publication Data

US 2021/0263741 A1    Aug. 26, 2021

(30) Foreign Application Priority Data

Feb. 20, 2020    (KR) .................. 10-2020-0020895

(51) Int. Cl.
  *G06F 9/30*    (2018.01)
  *G06F 8/41*    (2018.01)
  *G06F 9/54*    (2006.01)

(52) U.S. Cl.
  CPC .......... *G06F 9/30123* (2013.01); *G06F 8/441* (2013.01); *G06F 9/30036* (2013.01); *G06F 9/546* (2013.01)

(58) Field of Classification Search
  CPC .. G06F 9/30123; G06F 8/441; G06F 9/30036; G06F 9/546; G06F 9/355; G06F 9/3001; G06F 9/3012; G06F 9/3887
  See application file for complete search history.

(56) References Cited

U.S. PATENT DOCUMENTS

| | | | |
|---|---|---|---|
| 6,662,292 B1* | 12/2003 | Wilson | G06F 9/30036 711/215 |
| 10,346,944 B2 | 7/2019 | Nurvitadhi et al. | |
| 2009/0198959 A1* | 8/2009 | Hall | G06F 9/30054 712/202 |

(Continued)

FOREIGN PATENT DOCUMENTS

| | | |
|---|---|---|
| CN | 107239825 | 10/2017 |
| JP | 2019-159997 | 9/2019 |

(Continued)

OTHER PUBLICATIONS

International Search Report and Written Opinion dated Mar. 11, 2021 in corresponding International Application No. PCT/KR2020/016606.

*Primary Examiner* — Farley Abad
(74) *Attorney, Agent, or Firm* — Nixon & Vanderhye, P.C.

(57) ABSTRACT

An electronic device and a control method thereof are disclosed. The electronic device includes: a memory storing input data, and a processor including a first register file and a second register file storing index data corresponding to kernel data, wherein the processor is configured to: based on a first command being input, obtain offset information of valid data included in a part of the index data stored in the first register file, based on the number of pieces of the offset information being greater than or equal to a predetermined number, store data packed with the offset information in a unit of the predetermined number in the second register file, and obtain output data by performing an operation regarding the input data based on the packed data.

18 Claims, 8 Drawing Sheets

(56) References Cited

U.S. PATENT DOCUMENTS

| | | | |
|---|---|---|---|
| 2012/0159114 A1* | 6/2012 | Egger | G06F 9/30098 |
| | | | 711/203 |
| 2012/0203985 A1 | 8/2012 | Fossum | |
| 2016/0179574 A1 | 6/2016 | Merrill, III | |
| 2016/0292080 A1* | 10/2016 | Leidel | G06F 8/441 |
| 2016/0358069 A1* | 12/2016 | Brothers | G06F 7/764 |
| 2018/0129935 A1 | 5/2018 | Kim et al. | |
| 2018/0189056 A1 | 7/2018 | Turakhia et al. | |
| 2018/0189631 A1 | 7/2018 | Sumbul et al. | |
| 2018/0204110 A1 | 7/2018 | Kim et al. | |
| 2018/0260709 A1 | 9/2018 | Zhang et al. | |
| 2018/0260710 A1 | 9/2018 | Zhang et al. | |
| 2018/0260711 A1 | 9/2018 | Zhang et al. | |
| 2018/0330235 A1 | 11/2018 | Lin et al. | |
| 2019/0096025 A1 | 3/2019 | Nystad et al. | |
| 2019/0278600 A1 | 9/2019 | Frumkin et al. | |
| 2019/0289681 A1 | 9/2019 | Matsen et al. | |
| 2020/0051203 A1 | 2/2020 | Nurvitadhi et al. | |
| 2020/0073659 A1* | 3/2020 | Plotnikov | G06F 9/30032 |

FOREIGN PATENT DOCUMENTS

| | | |
|---|---|---|
| KR | 10-2018-0084289 | 7/2018 |
| KR | 10-2018-0093969 | 8/2018 |
| KR | 10-2019-0035551 | 4/2019 |
| KR | 10-2019-0049552 | 5/2019 |

* cited by examiner

ELECTRONIC DEVICE AND CONTROL METHOD THEREOF

CROSS-REFERENCE TO RELATED APPLICATION

This application is based on and claims priority under 35 U.S.C. § 119 to Korean Patent Application No. 10-2020-0020895, filed on Feb. 20, 2020, in the Korean Intellectual Property Office, the disclosure of which is incorporated by reference herein in its entirety.

BACKGROUND

1. Field

The disclosure relates to an electronic device and a control method thereof, and for example to an electronic device which performs an operation of obtaining offset information of valid data included in index data corresponding to compressed kernel data and a control method thereof.

2. Description of Related Art

The amount of data to be processed in the artificial neural network has been gradually increased along development and utilization of the neural network trained based on machine learning (e.g., deep learning) in various fields. Accordingly, in the related art, a structure of a processor was implemented as a parallel structure such as a single instruction multiple data (SIMD) processor structure to effectively process a larger amount of data by the artificial neural network.

However, the processor with a parallel structure such as the SIMD has to perform a separate operation to parallelize data. Therefore, the processor with the parallel structure in the related art had a limit, since a large amount of overhead is generated when compressing kernel data by identifying only valid data excluding 0 from weight data of kernel data included in an artificial neural network.

SUMMARY

Embodiments of the disclosure provide an electronic device determining input data to be input to a specific model based on voice data and output data obtained by inputting the voice data to a model for enhancing sound quality, and a method for controlling the electronic device.

According to an example embodiment of the disclosure, there is provided an electronic device, the electronic device including: a memory storing input data, and a processor including a first register file and a second register file storing index data corresponding to kernel data, wherein the processor is configured to: based on a first command being input, obtain offset information of valid data included in a part of the index data stored in the first register file, based on a number of pieces of the offset information being greater than or equal to a predetermined number, store data packed with the offset information in a unit of the predetermined number in the second register file, and obtain output data by performing an operation regarding the input data based on the packed data.

According to an example embodiment of the disclosure, there is provided a method for controlling an electronic device including a processor including a first register file and a second register file storing index data corresponding to kernel data, the method including: based on a first command being input, obtaining offset information of valid data included in a part of the index data stored in the first register file, based on the number of pieces of the offset information being greater than or equal to a predetermined number, storing data packed with the offset information in a unit of the predetermined number in the second register file, and obtaining output data by performing an operation regarding the input data based on the packed data.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

The disclosure addresses the above-mentioned problems and provides an electronic device which processes sparsity of kernel data using an operation of obtaining a virtual register file and offset information of index data corresponding to compressed kernel data, and a control method thereof.

The disclosure relates, for example, to a method for obtaining offset information of valid data among index data corresponding to kernel data included in layers of various artificial neural networks such as deep neural network (DNN), and importing activation data corresponding to compressed kernel data by storing data packed with the obtained offset information in a virtual register file. In other words, an electronic device of the disclosure may perform an efficient operation by processing sparsity of kernel data, in other words, activation data corresponding to the kernel data other than 0 among activation data corresponding to the kernel data, using the operation of obtaining a virtual register file and the offset information.

Hereinafter, various example embodiments of the disclosure will be described in greater detail with reference to the accompanying drawings.

Figure 1A:
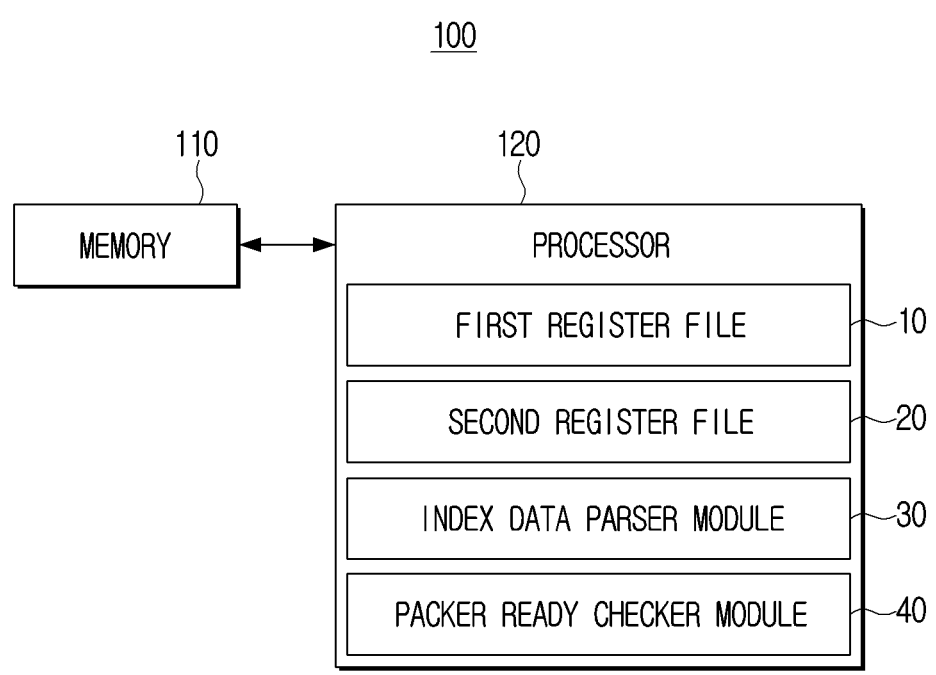
FIG. 1A is a block diagram illustrating an example configuration and an operation of an electronic device according to various embodiments.

FIG. 1A is a block diagram illustrating an example configuration of an example electronic device according to various embodiments. As illustrated in FIG. 1A, the electronic device 100 may include a memory 110 and a processor 120 (e.g., including processing circuitry). However, the configuration illustrated in FIG. 1A is an example for implementing the embodiments of the disclosure and the electronic device 100 may additionally include suitable hardware and software components apparent to those skilled in the art.

The memory 110 may store instructions or data related to at least another element of the electronic device 100. The memory 110 may be accessed by the processor 120 and reading, recording, editing, deleting, or updating of the data by the processor 120 may be executed.

For example, the memory 110 may store an instruction set corresponding to at least one program executable by the processor 120. The instruction may refer to one action statement directly executable by the processor 120 in a programming language and is a minimum unit for program execution or action. The memory 110 may store input data input via an input unit or the like. For example, the input data may include feature data of a voice input via a microphone or feature data of an image obtained via a camera. The input data may be data implemented as a vector or a matrix but this is merely an example, and the input data may be implemented as data in various forms such as a graph, a table, and the like.

The memory 110 may include kernel data included in each layer of an artificial neural network such as DNN or the like and index data corresponding to the kernel data. The kernel data may include data regarding a kernel (or a filter) including a weight value (e.g., a weight value included in a kernel, offset information of a weight value, and the like) for extracting or obtaining a feature value of the input data. The kernel data may be implemented as data in a form of a matrix or a vector, and if the kernel data is implemented as matrix data, a weight value may be mapped to each of an element (or entry) of the kernel data.

Figure 1B:
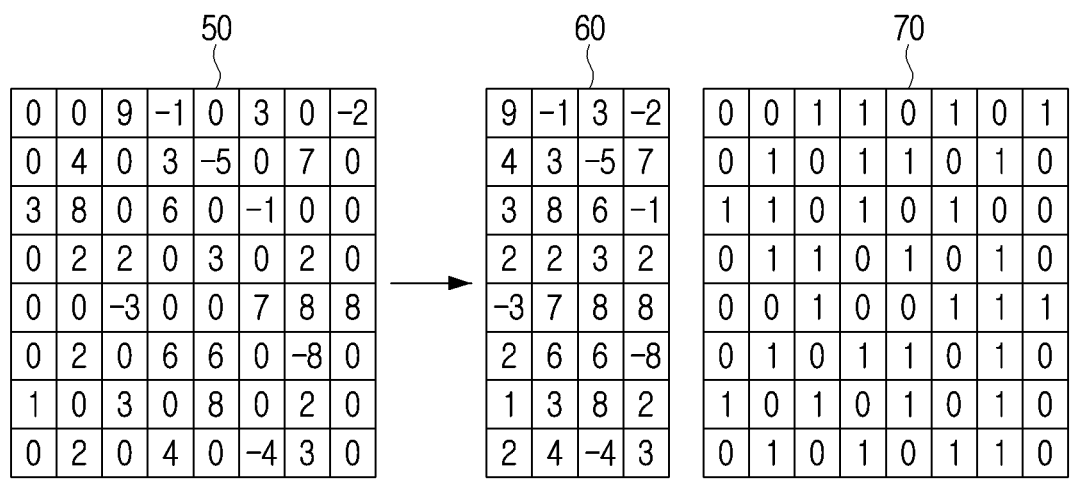
FIG. 1B is a diagram illustrating example kernel data and index data corresponding to the kernel data according to various embodiments.

The index data corresponding to the kernel data may be data including information regarding the weight value included in the kernel data. For example, the index data may be data for obtaining or identifying whether the weight value included in each element of the kernel data is 0 and offset information of each weight value. For example, referring to FIG. 1B, a kernel data 50 may be implemented as matrix data in form of 8×8 and a weight value of 0 or other than 0 may be mapped to each element of the matrix. An index data 70 corresponding to the kernel data 50 may be implemented as a matrix in form of 8×8 and each element of the index data 70 may be mapped with a value of 0 or 1. When the weight value of 0 is mapped to a specific element of the kernel data 50, the value of 0 may be mapped to the specific element of the index data 70. When the weight value other than 0 is mapped to the specific element of the kernel data 50, the value other than 0 may be mapped to the specific element of the index data 70. For example, referring to FIG. 1B, when 0 is mapped to a position of (1,1) of the index data 70, this may imply that the weight value of 0 is mapped to a position of (1,1) of the kernel data 50, and when 1 is mapped to a position of (1,3) of the index data 70, this may imply that the weight value other than 0 is mapped to a position of (1,3) of the kernel data 50. A value obtained by performing an operation between the kernel data 50 and the input data may be the same as a value obtained by an operation between compressed data 60 including only the weight values other than 0 of the kernel data 50 and input data of the index data 70.

The memory 110 may be implemented as a non-volatile memory, a volatile memory, a flash memory, a hard disk drive (HDD), or a solid state drive (SSD). A term, memory, in the disclosure may include the memory 110, a ROM (not illustrated) and a RAM (not illustrated) in the processor 120, or a memory card (not illustrated) (e.g., micro SD card or memory stick) mounted on the electronic device 100. In addition, the memory 110 may store a program and data for configuring various screens to be displayed on a display area of a display.

The non-volatile memory may refer to a memory holding stored information, even if the power supply is interrupted. The non-volatile memory may include at least one of, for example, a flash memory, a programmable read-only memory (PROM), magnetoresistive random-access memory (MRAM), and a resistive RAM (RRAM). The volatile memory may refer to a memory that needs continuous power supply to hold the stored information. The volatile memory may include at least one of, for example, a dynamic random-access Memory (DRAM) and a static RAM (SRAM).

The processor 120 may include various processing circuitry and be electrically connected to the memory 110 to perform general operations of the electronic device 100. In describing the disclosure, the processor 120 may include one or a plurality of processors and may be implemented as a generic-use processor such as a central processing unit (CPU). However, this is merely an example and the processor 120 may be implemented as a graphics dedicated processor such as a graphics processing unit (GPU) or a visual processing unit (VPU) or an artificial intelligence dedicated processor such as a neural processing unit (NPU).

The processor 120 may include a first register file 10 and a second register file 20 storing the index data corresponding to the kernel data. The register file may refer to an array of registers temporarily holding or storing various commands executed by the processor 120 and data targeted for the command (e.g., operand, address of operand, and the like).

The first register file 10 may be an array of general registers storing data targeted for the command executable by the processor 120. The processor 120 may load a part or the entirety of the index data corresponding to the kernel data stored in the memory 110 and store in the first register file 10. The second register file 20 may be a virtual register file that is accessible or compilable by a compiler using one virtual address. The second register file 20 may include predetermined entries (e.g., eight entries or the like) and each entry may store data packed with the offset information of the valid data included in the index data. FIG. 1A illustrates that the processor 120 includes one second register file 20, but this is merely an example, and the processor 120 may include a plurality of second register files 20. The compiler may include, for example, a tool or a program that converts a high-level programming language (e.g., C language) into a low-level programming language (e.g., assembly language or machine language).

In addition, the processor 120 may obtain various pieces of information by performing various operations through an index data parser module (e.g., including various processing circuitry and/or executable program elements) 30 and a packer ready checker module (e.g., including various processing circuitry and/or executable program elements) 40. Each module may be implemented as a software module or a hardware module and may be controlled by the processor 120. When a first command is input, the index data parser module 30 may obtain offset information of valid data included in a part of index data stored in the first register file 10 and may store data packed with the offset information in the second register file 20. When a second command is input, the packer ready checker module 40 may provide a message indicating whether an operation with the input data is executable based on whether at least one piece of data packed with the offset information is stored in the second register file 20.

For example, when the first command is input, the processor 120 may obtain the offset information of the valid data included in a part of the index data stored in the first register file through the index data parser module 30. For example, the processor 120 may obtain information regarding whether the valid data is included in a predetermined value (e.g., 128 bits) of data among the index data and the number of pieces of valid data included in the predetermined value of data through the index data parser module 30. The processor 120 may identify the valid data included in a part of the index data and obtain the offset information of the identified valid data at the same time or within a threshold time through the index data parser module 30. For example, the 128-bit index data in a vector form includes six pieces of valid data, the processor 120 may identify that the number of pieces of valid data is six and obtain the offset information of each of the six identified valid data at the same time or within a threshold time.

The first command may include at least one instruction and may be directly input by a user. However, this is merely an example, and when image or voice data is input via the input unit, the processor 120 may identify that the first command formed of at least one instruction is input and obtain the offset information of the valid data included in a part of the index data stored in the first register file. A term "user" may refer to a person using an electronic device or a device (e.g., an artificial intelligence electronic device) using an electronic device.

The index data may include data having a value of 0 or 1 and the valid data may be data having a value of 1. When a specific entry (or element) of the index data includes data having a value of 1, the processor 120 may identify that the specific entry of the kernel data has a weight value other than 0, and when a specific entry of the index data includes data of 0, the processor 120 may identify that the specific entry of the kernel data has a weight value of 0.

The offset information of the valid data may include information regarding a displacement difference from an address of an entry of the valid data to an address of an entry of first data of the index data. The processor 120 may access an offset address of the valid data included in the offset information of the valid data and load the data stored in the offset address of the valid data.

The processor 120 may identify whether a first time necessary for obtaining the offset information of the valid data included in a part of the index data exceeds a second time allocated for the compiler to compile the first command. For example, when the first command is input, the processor 120 may compile the first command (e.g., convert into at least one instruction implemented in a language executable by the processor 120) through the compiler stored in a form of program, and obtain the offset information of the valid data included in the index data by executing the at least one converted instruction through the index data parser module 30. The number of pieces of valid data included in a part of the index data may be identified during runtime, and accordingly, the processor 120 may not identify the first time necessary for obtaining the offset information of the valid data before the compiler compiles the first command. Accordingly, when the number of pieces of valid data is equal to or greater than a predetermined number, the first time may exceed the second time allocated or scheduled for the compiler to compile the first command. When it is identified that the first time exceeds the second time, the processor 120 may output a stall signal to control to not perform other operations except for the execution of the first command Since the processor 120 stops the other operations except for the execution of the first command, the compiler may compile the first command within the allocated or scheduled second time. The processor 120 may execute the first compiled command to obtain the offset information of the valid data of a part of the index data.

When the number of pieces of offset information is equal to or greater than a predetermined number, the processor 120 may store data packed with the offset information in a unit of the predetermined number in the second register file 20. The packing may include an operation of mapping the offset information of the valid data in one entry of the second register file. When the number of pieces of the offset information of the valid data of a part of the index data is equal to or less than the predetermined number, the processor 120 may obtain the offset information of the valid data included in the other part except for a part of the index data stored in the first register file. The processor 120 may store data packed with the offset information of the valid data included in the other part in the second register file 20.

When at least one piece of data packed with the offset information is stored in the second register file, the processor 120 may output a signal (e.g., valid signal) indicating that an operation regarding the input data is executable based on the data stored in the second register file. In other words, not only in a case where the data packed with the offset information is stored in all of the predetermined number of entries of the second register file 20, but also in a case where one piece of data packed with the offset information is stored in the second register file 20, the processor 120 may output a valid signal that is a signal indicating that the operation with the input data is executable. For example, after a threshold time from the output of the valid signal, the processor 120 may obtain output data by performing an operation regarding the input data stored in the memory 110 based on the packed data. In another example, when the valid signal is output and a command for performing an operation is input from a user, the processor 120 may perform an operation regarding the input data based on the packed data.

In another example, when the second command is input, the processor 120 may provide a message indicating whether an operation with the input data is executable based on whether at least one piece of data packed with the offset information is stored in the second register file through the packer ready checker module 40. Specifically, when the second command is input, the processor 120 may identify whether the at least one piece of data packed with the offset information is stored in the second register file through the packer ready checker module 40.

When it is identified that the at least one piece of the data packed with the offset information is stored in the second register file, the processor 120 may provide a message indicating that the operation regarding the input data is executable based on the packed data. In another example, when it is identified that the data packed with the offset information is not stored in the second register file, the processor 120 may provide a message indicating that the operation regarding the input data is not executable based on the packed data.

The processor 120 may provide a message regarding whether the operation with the data stored in the second register file and the input data is executable by executing the second command executable by the packer ready checker module 40. Since the second register file is a virtual register file accessible by the compiler using one virtual address, when the compiler accesses the register file using one virtual address, the processor 120 may convert the one virtual address into a physical address to control so that the compiler accesses the packed data stored in the second register file.

The processor 120 may perform the operation regarding the input data based on the packed data stored in the second register file. For example, the processor 120 may identify an offset address of each valid data through the offset information packed and stored in each entry of the second register file. The offset address of each valid data may be an offset address of the data stored in the kernel data. Accordingly, the electronic device 100 may access data stored in the identified offset address of the kernel data. In addition, the processor 120 may load the data accessed and perform the operation between the loaded data and the input data. When the loaded data and the input data are implemented as a matrix, a vector, or the like, the processor 120 may perform various operations such as addition, multiplication, inner product, outer product, and the like between the loaded data and the input data. An example embodiment related thereto will be described in greater detail below with reference to FIGS. 2A and 2B.

When the number of pieces of other data except for a part of the index data is equal to or less than the predetermined number, the processor 120 may perform padding regarding the other data except for a part of the index data. The padding performed regarding the other data except for a part of the index data may include an operation of mapping values of the other data except for a part of the index data, the number of which is equal to or less than the predetermined number, to 0. Accordingly, when the number of pieces of the other data except for a part of the index data is equal to or less than the predetermined number, the processor 120 may map the values of the other data except for a part of the index data to 0.

The function related to the artificial intelligence according to the disclosure may be performed through the memory 110 and the processor 120. One or a plurality of processors 120 may perform control to process the input data according to a predefined action rule stored in the memory 110 or an artificial intelligence model. The predefined action rule or the artificial intelligence model is formed through training. The forming through training herein may refer, for example, to forming a predefined action rule or an artificial intelligence model with a desired feature by applying a learning algorithm to a plurality of pieces of learning data. Such training may be performed in a device demonstrating artificial intelligence according to the disclosure or performed by a separate server/system.

The artificial intelligence model may include a plurality of neural network layers. Each layer has a plurality of weight values and executes an operation of the layer through an operation result of a previous layer and an operation of the plurality of weight values. Examples of the neural network include a convolutional neural network (CNN), deep neural network (DNN), recurrent neural network (RNN), restricted Boltzmann machine (RBM), deep belief network (DBN), bidirectional recurrent deep neural network (BRDNN), deep Q-network, or the like, but the neural network of the disclosure is not limited to the above examples, unless otherwise noted.

The learning algorithm may refer, for example, to a method for enabling a predetermined target machine (e.g., robot) to determine or predict by itself by training the predetermined target machine using a plurality of pieces of learning data. Examples of the learning algorithm include supervised learning, unsupervised learning, semi-supervised learning, or reinforcement learning, but the learning algorithm of the disclosure is not limited to the above examples, unless otherwise noted.

Figure 2A:
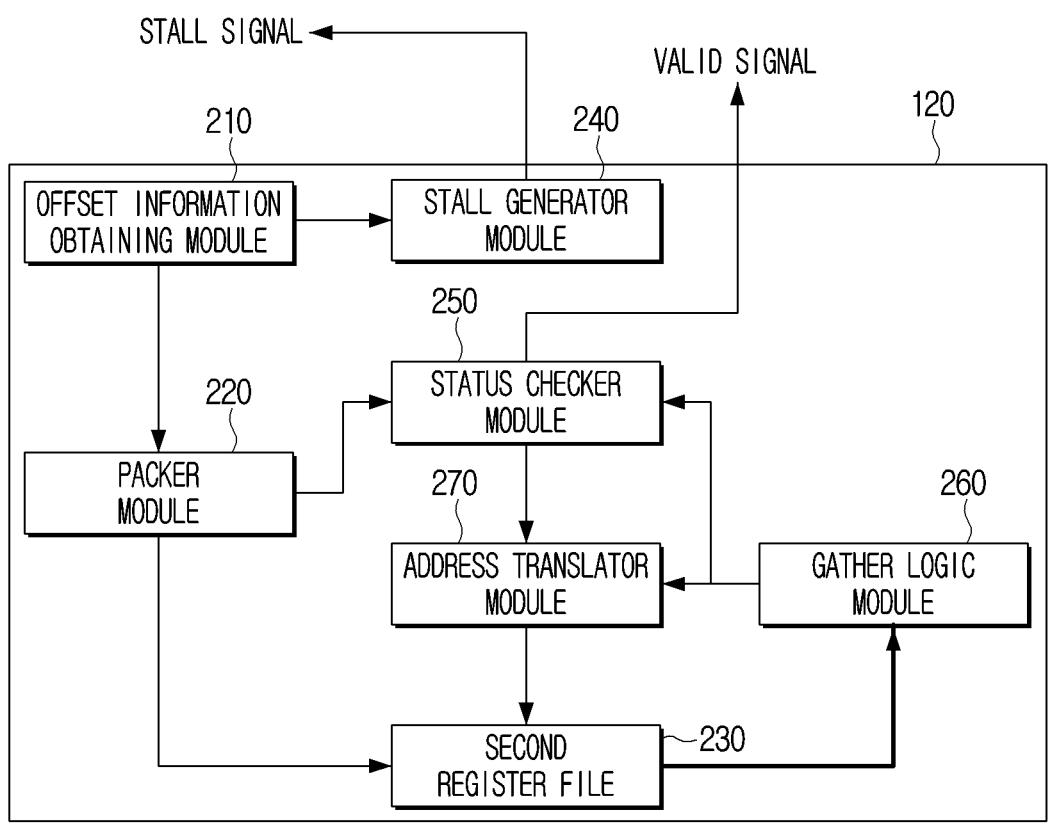
FIG. 2A is a diagram illustrating various example modules stored in the electronic device according to various embodiments.
Figure 2B:
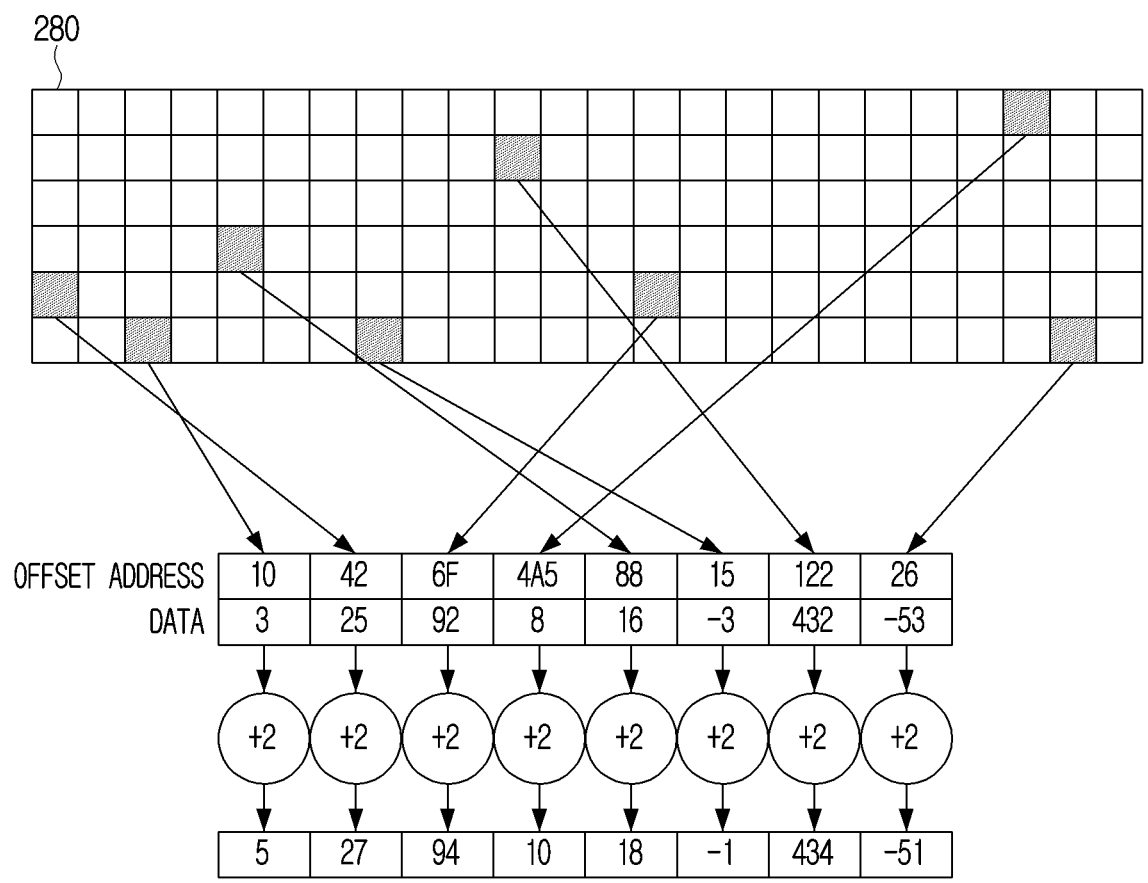
FIG. 2B is a diagram illustrating an example operation of the electronic device according to various embodiments.

FIGS. 2A and 2B are diagrams illustrating example operations of various software modules (e.g., executed by various processing circuitry and including various executable program elements) stored in the electronic device 100. The software module illustrated in FIG. 2A may be stored in the non-volatile memory and may be loaded to the volatile memory by the processor 120. FIG. 2A illustrates that the volatile memory is implemented as an element of the processor 120, but according to various embodiments, the volatile memory may be implemented as an element separate from the processor 120. The operations of various software modules may be controlled by the processor 120.

When the first command is input, an offset information obtaining module 210 may obtain the offset information of the valid data included in a part of the index data stored in the first register file. In other words, the offset information obtaining module 210 may obtain the offset information of the data having a value of 1 among data having a value of 0 or 1 included in a part of the index data stored in the first register file. The offset information of the valid data included in a part of the index data may include information regarding a displacement difference from an address of an entry of the valid data among the index data to an address of an entry of first data of the index data. Accordingly, the processor 120 may identify an offset address of the valid data included in the kernel data corresponding to the index data through the offset information of the valid data included in the index data and access the identified offset address.

The processor 120 may input the offset information of the valid data obtained through the offset information obtaining module 210 to a packer module 220. The packer module 220 may pack the offset information of the valid data obtained by the offset information obtaining module 210 in a unit of the predetermined number and store the packed data in entries of a second register file 230 in sequence. When the number of pieces of the offset information of the valid data is less than the predetermined number, the packer module 220 may pack the offset information and store in the entries of the second register file 230. The second register file 230 may be a virtual register file accessible and compilable by the compiler using one virtual address. An embodiment related to the second register file 230 has been described with reference to FIG. 1, and therefore the overlapped description may not be repeated here.

When the first command is input, the processor 120 may compile the first command in the high-level programming language through the compiler. When the first command is converted into at least one instruction in the low-level programming language directly executable by the processor 120, the processor 120 may obtain the offset information of the valid data included in the index data through the offset information obtaining module 210 by executing the at least one converted instruction. Since the number of pieces of the valid data included in a part of the index data may be identified during runtime, the processor 120 may not identify the first time necessary for obtaining the offset information of the valid data before the compiler compiles the first command. Accordingly, when the number of pieces of the valid data included in a part of the index data is equal to or greater than the predetermined number, the first time may exceed the second time allocated or scheduled for the compiler to compile the first command Therefore, when it is identified that the first time exceeds the second time, the processor 120 may output a stall signal through a stall generator module 240 to control to not perform other operations except for the execution of the first command. In other words, since the processor 120 stops the other operations, the compiler may compile the first command within the allocated or scheduled second time. The processor 120 may obtain offset information of the valid data of a part of the index data by executing the first compiled command.

When at least one piece of data packed with the offset information is stored in the second register file 230, the processor 120 may output a valid signal indicating that an operation regarding the input data is executable based on the data stored in the second register file 230 through a status checker module 250. In another example, when the second command is input, the processor 120 may compile the second command using the compiler to convert the second command into at least one instruction corresponding to the second command. The processor 120 may provide a message indicating whether an operation regarding the input data is executable based on whether at least one piece of data packed with the offset information is stored in the second register file 230 through the status checker module 250 by executing the at least one converted instruction corresponding to the second converted command. For example, the processor 120 may output a message indicating that the operation regarding the input data is executable as a voice or display the message on a display.

A gather logic module 260 may gather data stored in the kernel data using the offset information stored in the second register file 230. For example, referring to FIG. 2B, the gather logic module 260 may identify that the offset address is 10 through offset information packed in a first entry of the second register file 230. The offset address of the valid data included in the index data may be an offset address of data other than 0 of the kernel data corresponding to the index data. Accordingly, the gather logic module 260 may load 3 that is data stored with an offset address value of 10 among kernel data 280. The processor 120 may load a value obtained by adding a specific constant (e.g., 2 in a case of FIG. 2B) to the data loaded through the gather logic module 260 to a first entry of data in a vector form. When all pieces of data are loaded to eight entries, the processor 120 may obtain output data by performing the operation between the loaded data in a vector form and the input data. Accordingly, the processor 120 may obtain data corresponding to the data packed with the offset information stored in the second register file 230 in a unit of the predetermined number through the gather logic module 260 and perform the operation between the obtained data and the input data.

When the operation between the data obtained through the gather logic module 260 and the input data is completed, the processor 120 may output a signal indicating that the operation regarding the input data is currently not executable through the status checker module 250.

An address translator module 270 may be a module for, when the compiler compiles to access the second register file 230 using one virtual address, providing data necessary for the operation regarding the input data by converting the one virtual address into a physical address. In other words, the address translator module 270 may be a module for managing address information and the like that may vary depending on the amount of offset information generated during runtime.

The offset address among the offset information stored in the second register file 230 may be a virtual address. The address translator module 270 may convert the offset address that is a virtual address into a physical address. Accordingly, the processor 120 may convert the identified offset address into a physical address through the address translator module 270 to be accessible to the data stored in the converted physical address.

Figure 3:
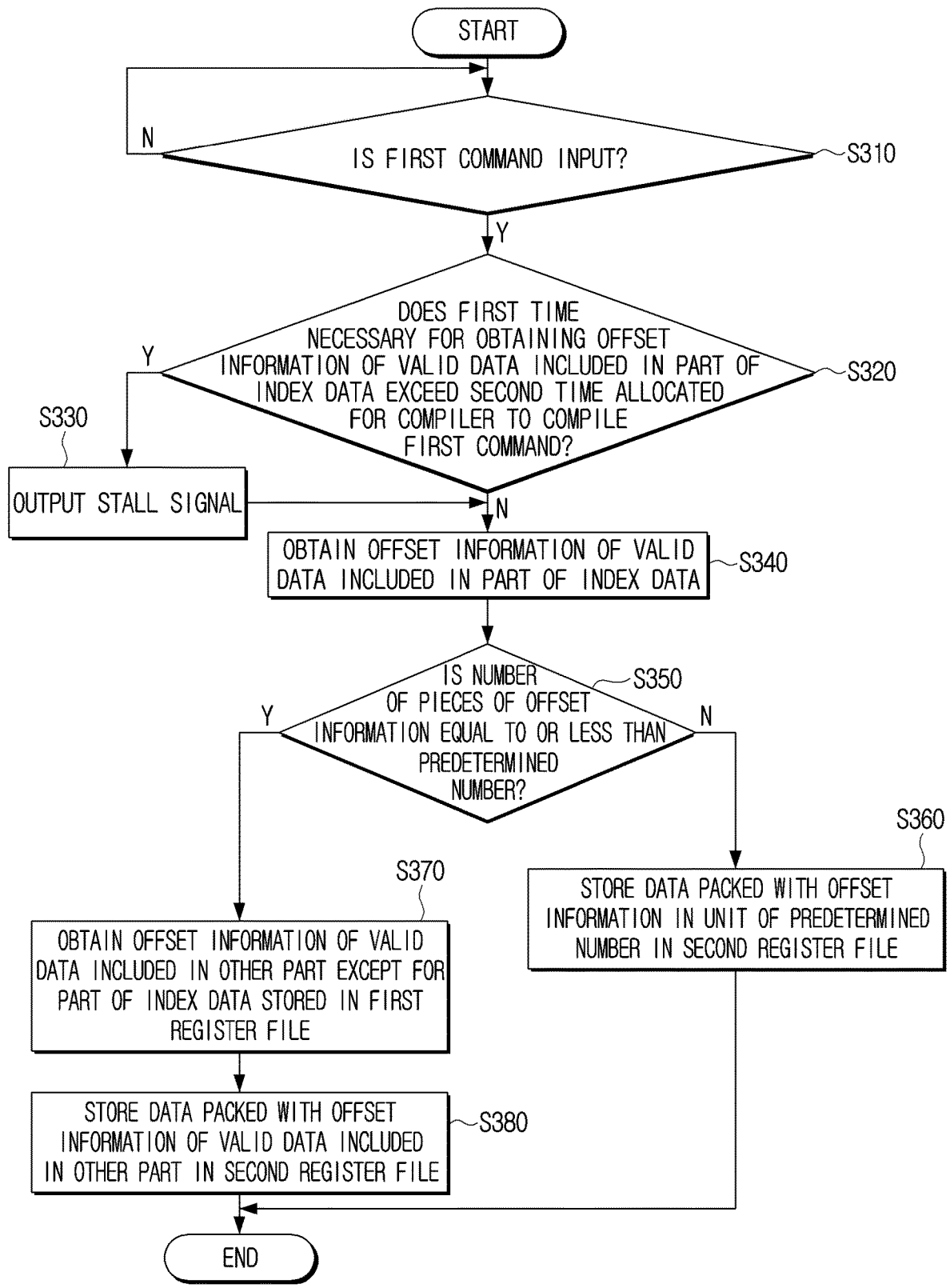
FIG. 3 is a flowchart illustrating an example process in which the electronic device obtains offset information included in the index data according various embodiments.

FIG. 3 is a flowchart illustrating an example process in which the electronic device 100 obtains offset information included in the index data according to an embodiment. The electronic device 100 may identify whether the first command is input (S310). When it is identified that the first command is input ("Y" in operation S310), the electronic device 100 may identify whether the first time necessary for obtaining the offset information of the valid data included in a part of the index data exceeds the second time allocated for the compiler to compile the first command (S320). When it is identified that the first time exceeds the second time, the electronic device 100 may output the stall signal. When the stall signal is output ("Y" in operation S320), the electronic device 100 may stop other operations except for the execution of the first command (S330). The electronic device 100 may obtain the offset information of the valid data included in a part of the index data (S340). When it is identified that the first time does not exceed the second time ("N" in operation S320), the electronic device 100 may immediately obtain the offset information of the valid data included in a part of the index data (S340).

The electronic device 100 may identify whether the number of pieces of the obtained offset information is equal to or less than the predetermined number (S350). When the number of pieces of the obtained offset information exceeds the predetermined number ("N" in operation S350), the electronic device 100 may store the data packed with the offset information in a unit of the predetermined number in the second register file (S360). For example, the electronic device 100 may store the packed data in each entry of the second register file in sequence. The electronic device 100 may load data stored in the physical address corresponding to the virtual address using the virtual address included in the offset information stored in each entry. The electronic device 100 may perform the operation between the loaded data and the input data.

When it is identified that the number of pieces of the obtained offset information is equal to or less than the predetermined number ("Y" in operation S350), the electronic device 100 may obtain the offset information of the valid data included in the other part except for a part of the index data stored in the first register file (S370). The electronic device 100 may store the data packed with the offset information of the valid data included in the other part in the second register file (S380).

Figure 4:
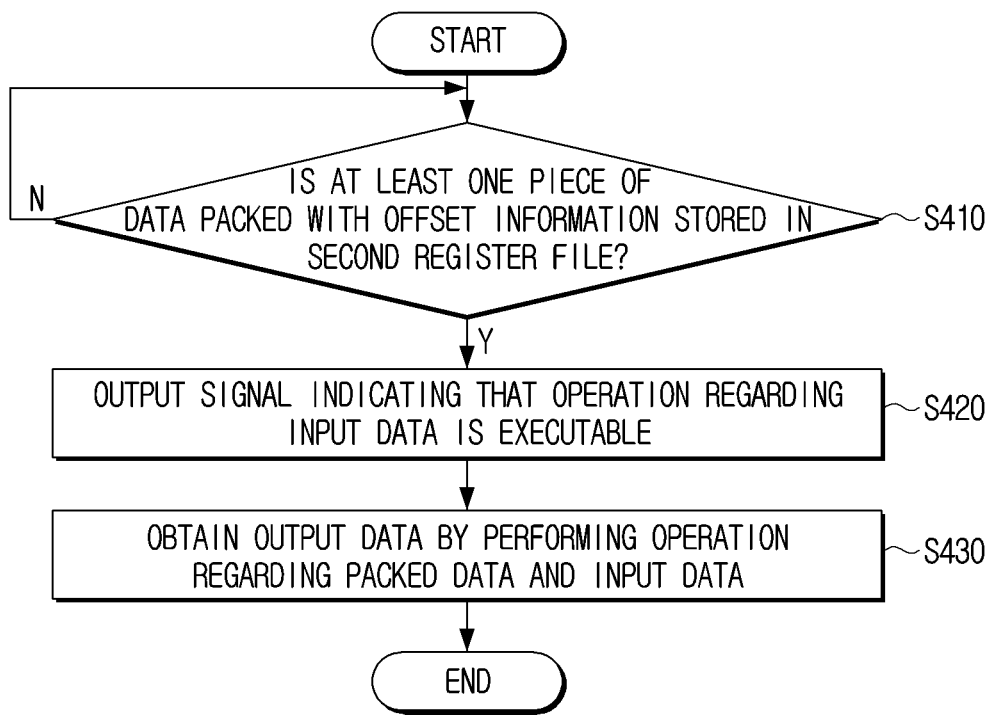
FIG. 4 is a flowchart illustrating an example process in which the electronic device obtains output data according to various embodiments.

FIG. 4 is a flowchart illustrating an example process in which the electronic device 100 obtains output data according to various embodiments.

The electronic device 100 may identify whether the at least one piece of data packed with the offset information is stored in the second register file (S410). When the at least one piece of data packed with the offset information is not stored in the second register file ("N" in operation S410), the electronic device 100 may repeat the process of obtaining the offset information of the valid data included in a part of the index data stored in the first register file.

When it is identified that the at least one piece of data packed with the offset information is stored in the second register file ("Y" in operation S410), the electronic device 100 may output a signal indicating that the operation regarding the input data is executable (S420). In other words, since the electronic device 100 outputs the signal indicating that the operation regarding the input data is executable based on the data stored in the second register file, the user may identify that the electronic device 100 may currently execute the operation with the input data.

When the second command is input, the electronic device 100 may provide a message regarding whether the operation with the input data is executable based on whether the at least one piece of data packed with the offset information is stored in the second register file. In other words, when the at least one piece of data packed with the offset information is stored in the second register file, the electronic device 100 may output the signal indicating that the operation regarding the input data is executable. In addition, when the second command is input, the electronic device 100 may provide a message indicating that the operation with the input data is executable.

The electronic device 100 may obtain the output data by performing the operation regarding the input data based on the packed data (S430). For example, the electronic device 100 may load the data included in the kernel data using the offset information packed and stored in each entry of the second register file. For example, when the second register file is formed of eight entries and the offset information is packed and stored in each entry, the electronic device 100 may identify the offset address among the offset information stored in each entry and access the data stored in the identified offset address. The electronic device 100 may load the data accessed and obtain the output data by performing the operation between the loaded data and the input data.

Figure 5:
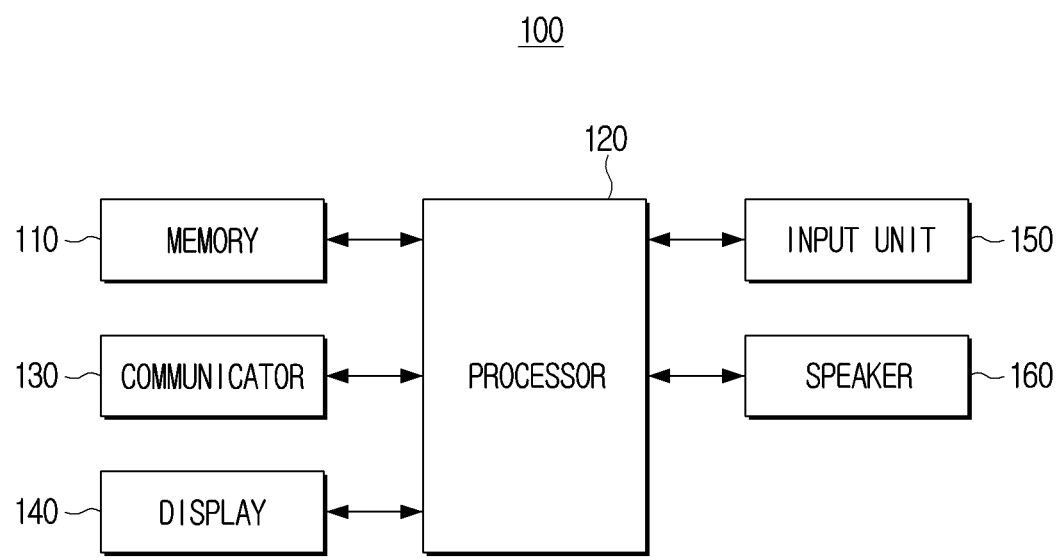
FIG. 5 is a block diagram illustrating an example configuration of the electronic device according to various embodiments.

FIG. 5 is a block diagram illustrating an example configuration of the electronic device 100 according to various embodiments. Referring to FIG. 5, the electronic device 100 may include the memory 110, the processor (e.g., including processing circuitry) 120, a communicator (e.g., including communication circuitry) 130, a display 140, an input unit (e.g., including input circuitry) 150, and a speaker 160. The memory 110 and the processor 120 have been described above with reference to FIG. 1, and therefore the overlapped description may not be repeated here.

The communicator 130 may include various communication circuitry and may communicate with a server (not illustrated) or an external device (not illustrated). For example, the processor 120 may receive or transmit various pieces of data and information from and to the server (not illustrated) or the external device (not illustrated) connected via the communicator 130. In particular, the communicator 130 may receive input data from the external server or the external device. Accordingly, the operation between the input data received by the communicator 130 and the data packed and stored in the second register file may be performed under the control of the processor 120.

The communicator 130 may include various communication modules including various communication circuitry for communicating with the external device. In an example, the communicator 130 may include a wireless communication module and, for example, include a cellular communication module using at least one of LTE, LTE Advance (LTE-A), code division multiple access (CDMA), wideband CDMA (WCDMA), universal mobile telecommunications system (UMTS), Wireless Broadband (WiBro), or global system for mobile communications (GSM). In another example, the wireless communication module may, for example, include at least one of wireless fidelity (Wi-Fi), Bluetooth, Bluetooth Low Energy (BLE), and Zigbee.

The display 140 may be implemented as a liquid crystal display panel (LCD), an organic light emitting diode (OLED), or the like and may also be implemented as a flexible display, a transparent display, or the like in some cases. The display 140 may also be implemented as a touch screen with a touch panel. However, the display is not limited to the above implementation and the display 140 may be implemented differently according to the type of the electronic device 100.

The display 140 may display various pieces of information under the control of the processor 120. In particular, the display 140 may display a message indicating whether the operation with the input data is executable based on whether the at least one piece of data packed with the offset information is stored in the second register file.

The input unit 150 may include various input circuitry and the processor 120 may receive a user command for controlling the operations of the electronic device 100 via the input unit 150. The input unit 150 may include a touch sensor, a (digital) pen sensor, a pressure sensor, a key, or the like. The touch sensor may use, for example, at least one type of an electrostatic type, a pressure-sensitive type, an infrared type, or an ultrasonic type.

For example, the first command and the second command may be input via the input unit 150. The first command or the second command may be input via the touch sensor, the key, or the like from the user. In addition, a trigger voice for activating each of the first command and the second command may be input via the input unit 150 implemented as a microphone.

The speaker 160 may output not only various pieces of audio data obtained by executing various processing such as decoding, amplification, or noise filtering by an audio processor (not illustrated), but also various alerts or voice messages. Particularly, the speaker 160 may output a message indicating that the operation with the input data is executable as a voice or an alert indicating that the operation with the input data is executable based on whether the at least one piece of data packed with the offset information is stored in the second register file under the control of the processor 120.

Figure 6:
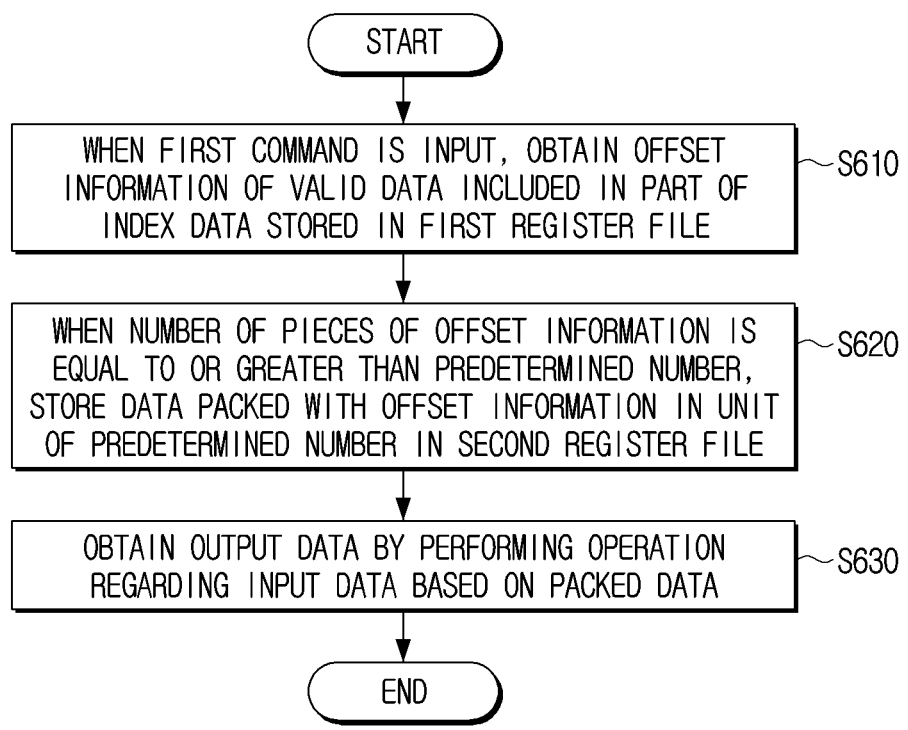
FIG. 6 is a flowchart illustrating an example method for controlling the electronic device according to various embodiments.

FIG. 6 is a flowchart illustrating an example method for controlling the electronic device 100 according to various embodiments. When the first command is input, the electronic device 100 may obtain the offset information of the valid data included in a part of the index data stored in the first register file (S610). For example, when the first command is input via the input unit implemented as a keyboard, a touch sensor, or a microphone from the user, the electronic device 100 may identify whether there is valid data in a part of the index data stored in the first register file. The first register file may store the index data corresponding to the kernel data. When the valid data is identified in a part of the index data, the electronic device 100 may obtain the offset information of the identified valid data.

When the number of pieces of the offset information is equal to or greater than the predetermined number, the electronic device 100 may store the data packed with the offset information in a unit of the predetermined number in the second register file (S620). When the second register file includes eight entries, the electronic device 100 may pack the offset information of the valid data included in a part of the index data in a unit of 8 pieces and store in each entry of the second register file. When the number of pieces of the offset information in a part of the index data is equal to or less than the predetermined number, the electronic device 100 may obtain the offset information of the valid data, the number of which is equal to or less than the predetermined number, included in a part thereof, and pack the obtained offset information and store in the second register file. The electronic device 100 may obtain the offset information of the valid data included in the other part excluding a part of the index data stored in the first register file.

The electronic device 100 may obtain output data by performing the operation regarding the input data based on the packed data (S630). For example, the electronic device 100 may identify the offset address among the offset information of the data packed and stored in each entry of the second register file. The electronic device 100 may access the data stored in the identified offset address and obtain the output data by loading the data accessed and performing the operation with the input data.

Through various embodiments of the disclosure, the electronic device may use the operation of obtaining the virtual register file and the offset information of the index data corresponding to the compressed kernel data, and accordingly, it is possible to reduce overhead generated when processing sparsity of the kernel data and also reduce power consumption due to the operation.

It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. The expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

The electronic device according to various embodiments of the disclosure may include at least one of, for example, a smartphone, a tablet PC, a desktop (PC), a laptop PC, a netbook computer, a server, a PDA, a medical device, a wearable device, or the like. In some embodiments, the electronic apparatus may include at least one of, for example, a television, a refrigerator, air-conditioner, an air purifier, a set-top box, and a media box (e.g., HomeSync™, APPLE™, or GOOGLE™).

Various embodiments of the disclosure may be implemented as software including instructions stored in machine (e.g., computer)—readable storage media. The machine is a device which invokes instructions stored in the storage medium and is operated according to the invoked instructions, and may include an electronic device (e.g., electronic device 100) according to the disclosed embodiments. When the instruction is executed by the processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory storage medium" is tangible and may not include signals, and it does not distinguish that data is semi-permanently or temporarily stored in the storage medium. For example, the "non-transitory storage medium" may include a buffer temporarily storing data.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product (e.g., downloadable app) may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While the disclosure has been illustrated and described with reference to various example embodiments, it will be understood that the various example embodiments are intended to be illustrative, not limiting. It will be understood by those of ordinary skill in the art that various changes in form and detail may be made without departing from the true spirit and full scope of the disclosure, including the appended claims and their equivalents.

What is claimed is:

1. An electronic device comprising:
a memory storing input data; and
a processor including a first register file and a second register file storing index data corresponding to kernel data,
wherein the processor is configured to:
based on a first command being input, obtain offset information of valid data included in a part of the index data stored in the first register file,
based on the number of pieces of the offset information being greater than or equal to a predetermined number, store data packed with the offset information in a unit of the predetermined number in the second register file, and
obtain output data by performing an operation regarding the input data based on the packed data.

2. The device according to claim 1, wherein the second register file is a virtual register file compilable by a compiler using one virtual address.

3. The device according to claim 2, wherein the processor is configured to: based on a compiler compiling to access the second register file using the one virtual address, provide data necessary for the operation regarding the input data by converting the one virtual address into a physical address.

4. The device according to claim 2, wherein the processor is configured to:
identify whether a first time necessary for obtaining the offset information of the valid data included in a part of the index data exceeds a second time allocated for the compiler to compile the first command, and
based on the first time exceeding the second time, stop operations other than execution of the first command by outputting a stall signal.

5. The device according to claim 2, wherein the processor is configured to:
based on a second command being input, provide a message indicating whether the operation regarding the input data is executable based on whether at least one piece of data packed with the offset information is stored in the second register file.

6. The device according to claim 1, wherein the index data includes data having a value of 0 or 1, and
wherein the valid data is data having a value of 1.

7. The device according to claim 1, wherein the processor is configured to:
based on the number of pieces of the offset information being less than or equal to the predetermined number, obtain offset information of valid data included in an other part other than the part of the index data stored in the first register file; and
store data packed with the offset information of the valid data included in the other part in the second register file.

8. The device according to claim 1, wherein the processor is configured to:
based on at least one piece of data packed with the offset information being stored in the second register file, output a signal indicating that the operation regarding the input data is executable based on the data stored in the second register file.

9. The device according to claim 1, wherein the processor is configured to:
based on the number of pieces of other data other than the part of the index data being less than or equal to the predetermined number, perform a padding operation with respect to the other data except for the part of the index data.

10. A method for controlling an electronic device including a processor including a first register file and a second register file storing index data corresponding to kernel data, the method comprising:
based on a first command being input, obtaining offset information of valid data included in a part of the index data stored in the first register file;
based on the number of pieces of the offset information being greater than or equal to a predetermined number, storing data packed with the offset information in a unit of the predetermined number in the second register file; and
obtaining output data by performing an operation regarding the input data based on the packed data.

11. The method according to claim 10, wherein the second register file is a virtual register file compilable by a compiler using one virtual address.

12. The method according to claim 11, wherein based on a compiler compiling to access the second register file using the one virtual address, providing data necessary for the operation regarding the input data by converting the one virtual address into a physical address.

13. The method according to claim 11, wherein the obtaining the offset information comprises:
identifying whether a first time necessary for obtaining the offset information of the valid data included in a part of the index data exceeds a second time allocated for the compiler to compile the first command; and
based on the first time exceeding the second time, stopping other operations other than execution of the first command by outputting a stall signal.

14. The method according to claim 11, further comprising:
based on a second command being input, providing a message indicating whether the operation regarding the input data is executable based on whether at least one piece of data packed with the offset information is stored in the second register file.

15. The method according to claim 10, wherein the index data includes data having a value of 0 or 1, and
wherein the valid data is data having a value of 1.

16. The method according to claim 10, wherein the obtaining the offset information comprises:
based on the number of pieces of the offset information being less than or equal to the predetermined number, obtaining offset information of valid data included in an other part other than the part of the index data stored in the first register file; and
storing data packed with the offset information of the valid data included in the other part in the second register file.

17. The method according to claim 10, wherein the storing comprises, based on at least one piece of data packed with the offset information being stored in the second register file, outputting a signal indicating that the operation regarding the input data is executable based on the data stored in the second register file.

18. The method according to claim 10, further comprising:
based on the number of pieces of other data other than the part of the index data being less than or equal to the predetermined number, performing a padding operation with respect to the other data other than the part of the index data.

* * * * *